United States Patent
Dunk et al.

(10) Patent No.: US 8,706,022 B2
(45) Date of Patent: Apr. 22, 2014

(54) EQUATION EDITOR

(75) Inventors: Michael F. Dunk, Middleton, WI (US); Mary Crist, Marathon, FL (US)

(73) Assignee: Educational Testing Service, Princeton, NJ (US)

( * ) Notice: Subject to any disclaimer, the term of this patent is extended or adjusted under 35 U.S.C. 154(b) by 1347 days.

(21) Appl. No.: 12/177,745

(22) Filed: Jul. 22, 2008

(65) Prior Publication Data
US 2009/0024934 A1      Jan. 22, 2009

Related U.S. Application Data

(62) Division of application No. 10/775,301, filed on Feb. 10, 2004, now Pat. No. 7,466,958.

(60) Provisional application No. 60/445,823, filed on Feb. 10, 2003.

(51) Int. Cl.
*G09B 7/00* (2006.01)

(52) U.S. Cl.
USPC .......................................... 434/353; 434/350

(58) Field of Classification Search
USPC ................................. 434/353, 350
See application file for complete search history.

(56) References Cited

U.S. PATENT DOCUMENTS

| | | | |
|---|---|---|---|
| 5,211,564 A | 5/1993 | Martinez et al. | |
| 6,018,617 A | 1/2000 | Sweitzer et al. | |
| 6,112,049 A | 8/2000 | Sonnenfeld | |
| 6,149,441 A | 11/2000 | Pellegrino et al. | |
| 6,302,698 B1 * | 10/2001 | Ziv-El | 434/350 |
| 6,628,918 B2 | 9/2003 | Roschelle et al. | |
| 2001/0034016 A1 | 10/2001 | Ziv-el et al. | |
| 2002/0127533 A1 | 9/2002 | Grant | |
| 2002/0132213 A1 | 9/2002 | Grant et al. | |
| 2004/0018479 A1 * | 1/2004 | Pritchard et al. | 434/350 |
| 2004/0126745 A1 | 7/2004 | Bell et al. | |
| 2004/0153509 A1 | 8/2004 | Alcorn et al. | |

OTHER PUBLICATIONS http://www.wolfrarn.com/products/webmathematica/index.html as of Nov. 20, 2007 4:31 P.M. Central Standard Time.
http://www.latex-project.org as of Nov. 20, 2007 4:30 P.M. Central Standard Time.
Lamport, LaTeX: A Document Preparation System, Addison-Wesley, 2r4 ed., 1994 (TOC).
Goossens at al., The LaTeX Companion, Addison-Wesley, 1994 (TOC).
International Application of PCT Application No. PCT/US2004/003797, Aug. 18, 2006.

* cited by examiner

*Primary Examiner* — Kathleen Mosser
(74) *Attorney, Agent, or Firm* — Jones Day

(57) ABSTRACT

An on-line teaching and learning system with rapid change-by-change or real time reinforcement signals for students and simultaneous monitoring by the teacher of the actual responses as well as their correctness is disclosed. The system may include at least one teacher computer, a plurality of student computers operably connected to the at least one teacher computer by a communications network. The system may be used in a classroom setting or in a distance-learning environment.

33 Claims, 7 Drawing Sheets

FIG. 3

EQUATION EDITOR

CROSS-REFERENCE TO RELATED APPLICATIONS

The present application claims priority to U.S. Provisional Application No. 60/445,823, filed on Feb. 10, 2003, entitled "EQUATION EDITOR." This application is a divisional application of U.S. Ser. No. 10/775,301, filed on Feb. 10, 2004, entitled "EQUATION EDITOR.", and published on Aug. 12, 2004 as USPA 2004/0157203A1, which is hereby incorporated by reference in its entirety.

U.S. Pat. No. 6,302,698, filed on Feb. 16, 1999, and U.S. Application Serial No. 2001/0034016, filed on Jan. 12, 2001, are hereby incorporated by reference in their entireties.

FIELD OF THE INVENTION

The present invention generally relates to the field of electronic editing and review. The present invention particularly relates to methods and systems for creating, editing, transmitting and receiving equations in an electronic format. In a preferred embodiment, one or more computer systems are used to construct, edit and/or transmit equations to a remote terminal where the submitted equations, for example, may be reviewed for correctness.

BACKGROUND OF THE INVENTION

Instructors and testing professionals generally regard mathematical problem solving experience as an effective method of developing math skills. In this regard, literature pertaining to the teaching of math suggests that solving a greater number of problems may facilitate improvement in a student's math ability.

As the use of computers in classrooms and in home learning environments has increased, students have increasingly desired to solve math problems using computer systems. A number of conventional computer-based equation and expression editors have become available for students to use, including MathML, WebMathematica, Quickmath, NetTutor™, and LaTeX.

MathML is intended to facilitate the use and re-use of mathematical and scientific content on the Internet and for other applications such as computer algebra systems, print typesetting and voice synthesis. MathML can be used to encode both the presentation of mathematical notation for high-quality visual displays and mathematical content for applications where semantics are generally important, such as in scientific or voice synthesis software.

WebMathematica is based on Mathematica Server Page ("MSP") technology. MSP technology allows a website to include HTML pages that are enhanced by the addition of Mathematica commands. When a user requests such a page, which are generally called MSP scripts or more simply MSPs, Mathematica commands within the page description are evaluated, and the result is placed on the page.

QuickMath is an automated service for answering common math problems over the Internet.

LaTeX is a document preparation system that permits high-quality typesetting. LaTeX is typically used for medium to large technical or scientific documents; however, it may be used for almost any form of publishing.

All of the above-described math tools permit the user to draft equations using a computer-based system. However, none of the tools permits equations to be drafted in a real time teaching environment in which students interact with a teacher.

NetTutor™ is a distance-learning environment for the dissemination of online content. NetTutor™ is an Internet-based graphical chat window that is threaded and platform independent. It allows students to use their computers to access learning materials in a non-linear fashion or in real time with live corresponding tutors. Only one student may interact with a tutor at a time although a plurality of students may view the interaction.

However, NetTutor™ does not permit a teacher to interact with a plurality of students concurrently by posing a question and receiving mathematical expressions as responses from each student. Moreover, mathematical expressions entered into NetTutor™ are not evaluated for correctness by the system based on a previously constructed answer set.

What is needed is a system and method for permitting a plurality of students to interact with a teacher using a computer-based equation editor.

A need exists for a system and method for permitting a plurality of remote computer systems to receive, edit and submit equations to a central computer terminal for scoring and/or review.

A further need exists for real time systems and methods for performing one or more of the listed functions.

A still further need exists for a system that can automatically compare received responses to a previously constructed answer set for real time determination of whether the responses are correct.

The present invention is directed towards solving one or more of these problems.

SUMMARY OF PREFERRED EMBODIMENTS

Before the present methods, systems, and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to an "equation" is a reference to one or more equations and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

In a preferred embodiment, a system for editing, comparing, and resolving equations includes a communications network, at least one teacher computer, and a plurality of student computers. Each student computer and each teacher computer are operably connected via the communications network. Each teacher computer includes an input device, a display, and a computer-readable storage medium containing program instructions for implementing a teacher equation editor application. Each student computer includes an input device, a display, and a computer-readable storage medium containing program instructions for implementing a student equation editor application.

The teacher equation editor application may include one or more program instructions for implementing a communications protocol that controls communication between the teacher computer and the plurality of student computers via the communications network. The teacher equation editor application may include one or more program instructions for receiving a question description via the input device, storing the question description, receiving one or more answers corresponding to the question description via the input device, and storing the one or more answers. Each answer may include one or more of an equation and an expression. The input device for the teacher computer may include a pointing device and/or a keyboard. In an embodiment, the question description is stored in the computer-readable storage medium of the teacher computer. In an embodiment, one or more answers are stored in the computer-readable storage medium of the teacher computer. The teacher equation editor application further includes one or more program instructions for transmitting the question description to each student computer via the communications network. The teacher equation editor application further includes one or more program instructions for receiving a response from one of the plurality of student computers via the communications network, and comparing the response with the one or more answers corresponding to the question description. At least one response may be received in a rendered format and/or a character syntax. In an embodiment, comparing the response includes rendering the response from the character syntax into a rendered expression. The teacher equation editor application further includes one or more program instructions for displaying the rendered expression on the display of the teacher computer. The teacher equation editor application further includes one or more program instructions for storing an indication that the response is correct, if the response is equal to at least one answer, and storing an indication that the response is incorrect, if the response is not equal to at least one answer. The teacher equation editor application further includes one or more program instructions for generating a learning reinforcement signal. The teacher equation editor application further includes one or more program instructions for transmitting a learning reinforcement signal to the student computer. The reinforcement signal is transmitted at substantially the same time as the comparison of the response with the one or more answers completes. The teacher equation editor application may include a web browser application.

The student equation editor application includes one or more program instructions for receiving a question description via the communications network, displaying the question description on the display corresponding to the student computer, and receiving one or more responses to the question description via the input device. Each response includes one or more of an equation and an expression. The input device for the student computer includes a pointing device and/or a keyboard. At least one response is received in a character syntax and/or a rendered format. The student equation editor application further includes one or more program instructions for transmitting at least one response to the teacher computer via the communications network. In an embodiment, transmitting at least one response occurs at substantially the same time as the at least one response is received via the input device. The at least one response is transmitted in a character syntax. The student equation editor application further includes one or more program instructions for generating at least one learning reinforcement signal, and displaying the at least one learning reinforcement signal on the display corresponding to the student computer display. Generating at least one reinforcement signal occurs at substantially the same time as at least one response to the question description is received. The student equation editor application further includes one or more program instructions for receiving at least one learning reinforcement signal from the teacher computer via the communications network, and displaying the at least one learning reinforcement signal on the display corresponding to the student computer. The student equation editor application includes a web browser application.

In an embodiment, the system for editing, comparing and resolving equations further includes a comparison device. Each student computer, each teacher computer and the comparison device are operably interconnected via the communications network. The comparison device includes a computer-readable storage medium. The comparison device includes a comparison application comprising one or more program instructions for receiving a response from one of the plurality of student computers via the communications network, and comparing the response with the one or more answers corresponding to the question description. At least one response may be received in a rendered format and/or in a character syntax. In an embodiment, comparing the response includes rendering the response from the character syntax into a rendered expression. In an embodiment, the teacher equation editor application further includes one or more programming instructions for receiving the response, rendering the response into a rendered expression, and displaying the rendered expression on the display of the teacher computer. The comparison application further includes one or more program instructions for storing an indication that the response is correct, if the response is equal to at least one answer, and storing an indication that the response is incorrect, if the response is not equal to at least one answer. The comparison application further includes one or more program instructions for transmitting a learning reinforcement signal to the student computer. The reinforcement signal is transmitted at substantially the same time as the comparison of the response with the one or more answers completes. The student equation editor application further includes one or more program instructions for transmitting at least one response to the comparison device via the communications network. In an embodiment, transmitting at least one response occurs at substantially the same time as the at least one response is received via the input device. The at least one response is transmitted in a character syntax. The student equation editor application further includes one or more program instructions for receiving at least one learning reinforcement signal from the comparison device via the communications network.

In an embodiment, a method of editing, comparing and resolving equations includes receiving a question description on a teacher computer system, receiving one or more answers on a teacher computer system, and transmitting the question description to a plurality of student computer systems. Each answer includes one or more of an equation and an expression. The method may further include receiving a plurality of responses, and determining, for each response, if the response matches at least one answer. At least one response is received from each of the plurality of student computer systems. The method may further include transmitting at least one learning reinforcement to the second computer system associated with the response. The type of learning reinforcement may be determined by whether the response matches at least one answer.

In an embodiment, a method of editing, comparing, and resolving equations includes receiving a question description on a student computer system from a teacher computer system, displaying the question description, receiving at least one response to the question description, and transmitting the at least one response to the teacher computer system. Each response includes one or more of an equation and an expression. The method may further include receiving at least one learning reinforcement from the teacher computer system.

BRIEF DESCRIPTION OF THE DRAWINGS

The accompanying drawings, which are incorporated in and form a part of the specification, illustrate preferred embodiments of the present invention and, together with the description serve to explain the principles of the invention. The embodiments illustrated in the drawings should not be read to constitute limiting requirements, but instead are intended to assist the reader in understanding the invention.

FIG. 3 depicts a screen capture of an exemplary teacher view of rendered student responses according to an embodiment of the present invention.

DETAILED DESCRIPTION OF PREFERRED EMBODIMENTS

Figure 1:
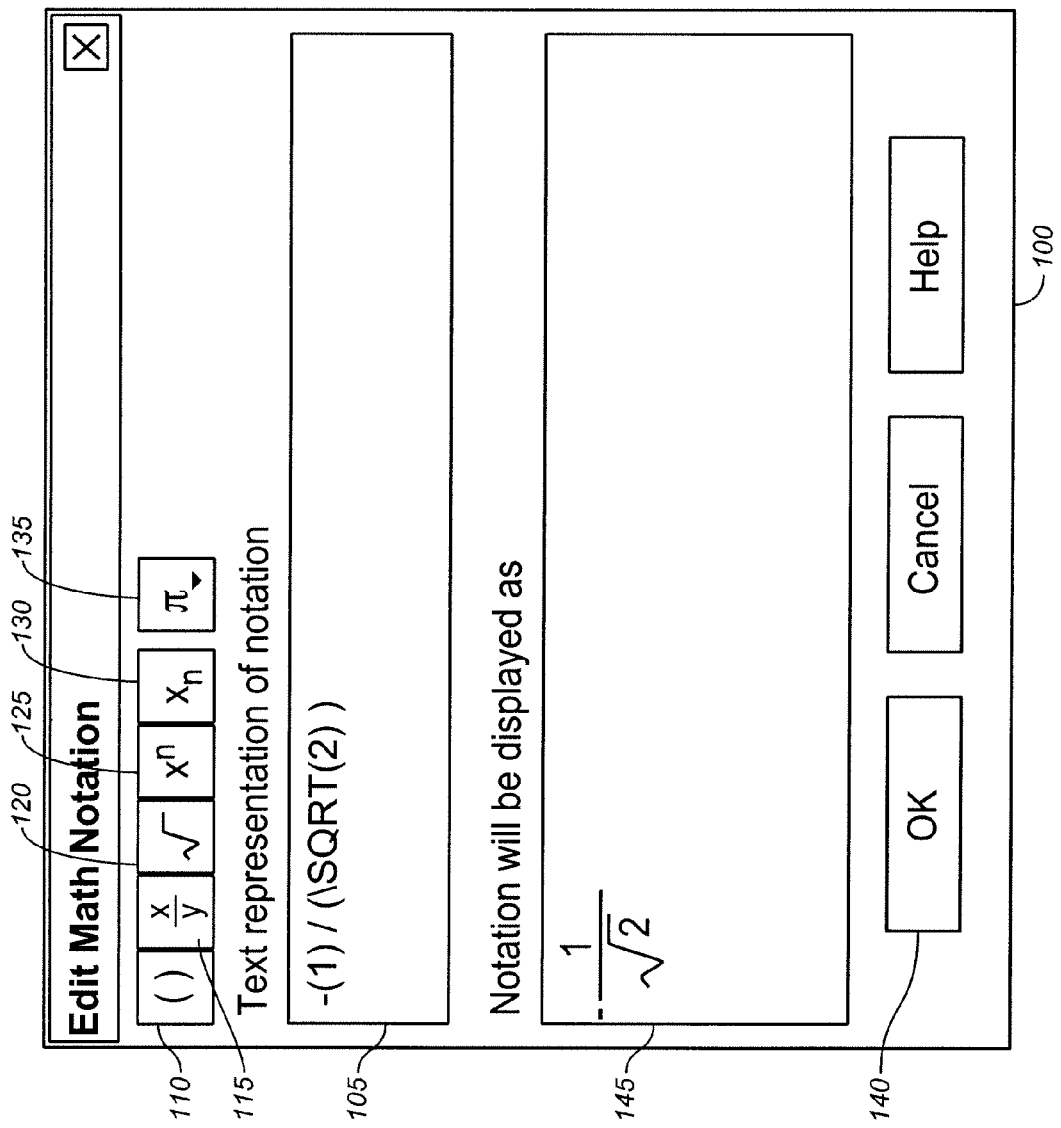
FIG. 1 depicts a screen capture of an exemplary teacher equation editor dialog window according to an embodiment of the present invention.

In the following description, various embodiments of an equation editor system, along with methods of construction and use are provided. The examples contained herein refer specifically to mathematical equations. In general, the terms "mathematical equation" or simply "equation" refer to technical expressions typically associated with mathematical and/or scientific symbols. However, it is to be understood that the invention is not limited to the manipulation of mathematical equations or expressions. Alternate embodiments of the present invention may be used to represent, for example, sentence structure or chemical compounds. Additional embodiments of the invention may be utilized to manipulate a variety of symbols, expressions and the like.

In an embodiment, the present invention relates to on-line teaching and monitoring of student learning on a plurality of computer devices connected via a communications network, such as an intranet and/or the Internet. Each computer may include an input device, a display and/or a computer-readable storage medium for storing program instructions. Each computer device may use, for example, a web browser as an interface with the communications network. Preferably, the on-line teaching and learning system provides change-by-change and/or real time reinforcement signals for students. Simultaneously, the on-line teaching and learning system provides monitoring by the teacher of the current student responses and an indication of the correctness of the answer. The system may operate using a packet switched communications network, a cell switched communications network, a direct connection or any other communications protocol or connection type. The system may include one or more teacher computers. The student computers may be co-located with the teacher computer and/or may connect to the teacher computer from a remote location.

A convenient interface for entering expressions and equations may be provided. The interface may facilitate the submission of expressions and equations that would be difficult to enter using a standard keyboard. A teacher may use an interface, such as the one shown in FIG. 1 at 100, to pose one or more questions to students. Students may use a similar interface, such as 405 in FIG. 4, to respond to questions. The teacher computer, the student computer or a comparison device may evaluate the student responses on a change-by-change basis and/or in real time for correctness. In an embodiment, the teacher computer may further provide real time reinforcement signals to student computers. In an embodiment, each of the teacher computer and the student computers may generate real time reinforcement signals. In an embodiment, student responses may be evaluated on a separate comparison device. The comparison device may generate and transmit real time reinforcement signals to one or more of the teacher computer and the student computer that transmitted the student response corresponding to the reinforcement signal. Simultaneous monitoring, including updating each change in each student response, may be provided by the teacher computer, the student computer and/or the comparison device.

Figure 2:
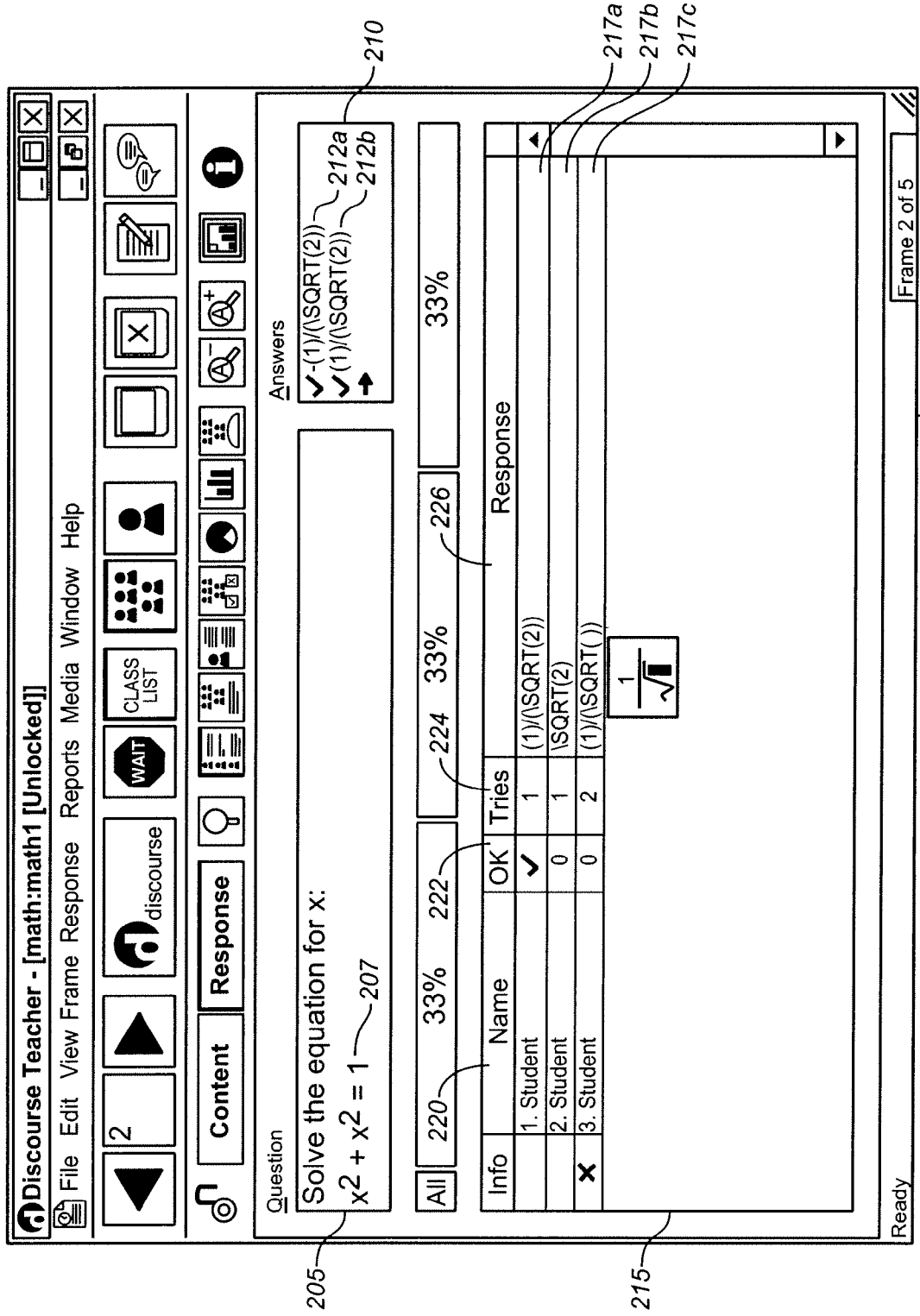
FIG. 2 depicts a screen capture of exemplary student responses on a teacher computer according to an embodiment of the present invention.

As shown in FIG. 2, a teacher computer may display an interface 200, which includes a question frame 205, an answer frame 210, and a current student response frame 215. The question frame 205 may contain a question 207 that is transmitted to each of the student computers. The answer frame 210 may contain one or more answers 212a-b to the corresponding question 207. The current student response frame 215 may include information pertaining to one or more student responses 217a-c. In a preferred embodiment, for each student, the information pertaining to the one or more student responses 217a-c may include, for example, the student's name 220, an answer correct field 222, the number of times the student has attempted to answer the question 224, and the current student response 226. The current student response 226 may be updated on a change-by-change basis and/or in real time based on input from the corresponding student using a student computer. The teacher interface 200 may evaluate whether the current student response 226 for a particular student is correct. If a current student response 226 matches one or more of the answers 212a-b, the teacher interface 200 may provide an indication in the corresponding answer correct field 222 and send a reinforcement signal to the student computer.

Figure 3:
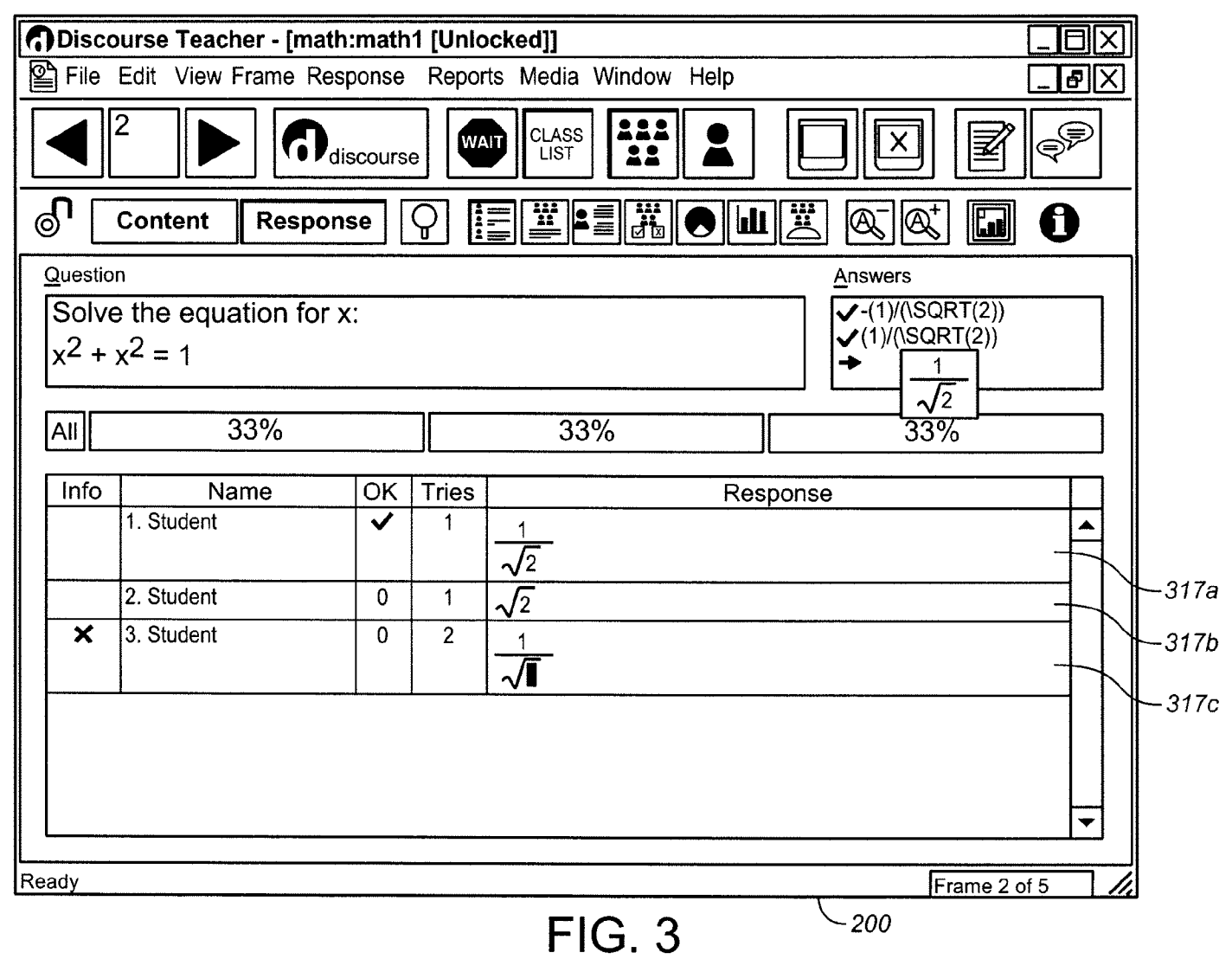

A character-based syntax that describes the entered equation or expression may be provided. The syntax may be designed to be easily understood and entered by a student or teacher. In addition, the representation of the equation may allow easy verification of correctness by a teacher using a teacher computer. A display showing the rendered equation or expression may be provided, as shown in FIG. 3. The teacher computer may render the equation or expression in real time as the equation or expression is entered. Equations or expressions may be entered by, for example, selecting one or more symbols from a menu, selecting one or more symbols using buttons in the application, using one or more hotkeys, and/or entering information in the character-based syntax. In an embodiment, all symbols, variables, and operations may be presented to the user simultaneously as a palette of buttons. In the case of question development, the rendered equation or expression may be displayed in the rendered expression display window 145 of the teacher equation editor interface 100. In the case of student responses, rendered equations or expressions 317a-c based on equations or expressions from one or more student computers may be displayed on the teacher computer in the teacher interface 200.

Preferably, teachers and students may use the equation editor to enter math notation, as required for questions, answers and student responses. In an Edit Math Notation dialog window, such as 100, text representation of math notation may be entered in a text box, such as 105. Other Edit Math Notation dialog windows are shown at 410 and 505. The text representation may be displayed substantially in real time on a graphical display. Text and/or select symbols and expressions may be selected from, for example, one or more toolbars, one or more menus, hot keys, or a set of buttons. Selected entries may be highlighted in the text box 105 by, for example, displaying the entries in a different color, changing the background color for the entries, or altering the size of the entries.

Figure 4:
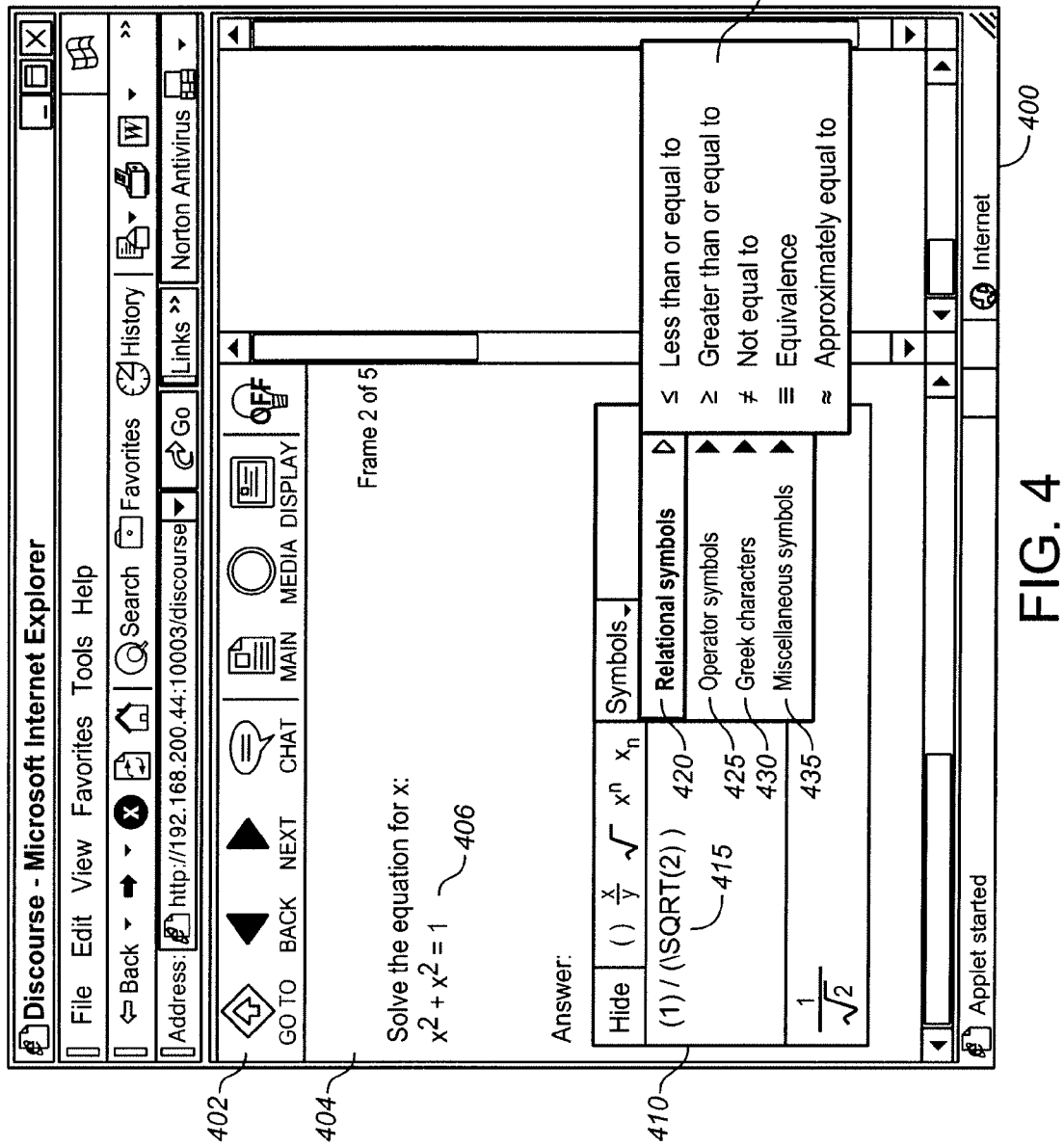
FIG. 4 depicts a screen capture of an exemplary student browser view of a rendered equation and an equation editor according to an embodiment of the present invention.
Figure 5:
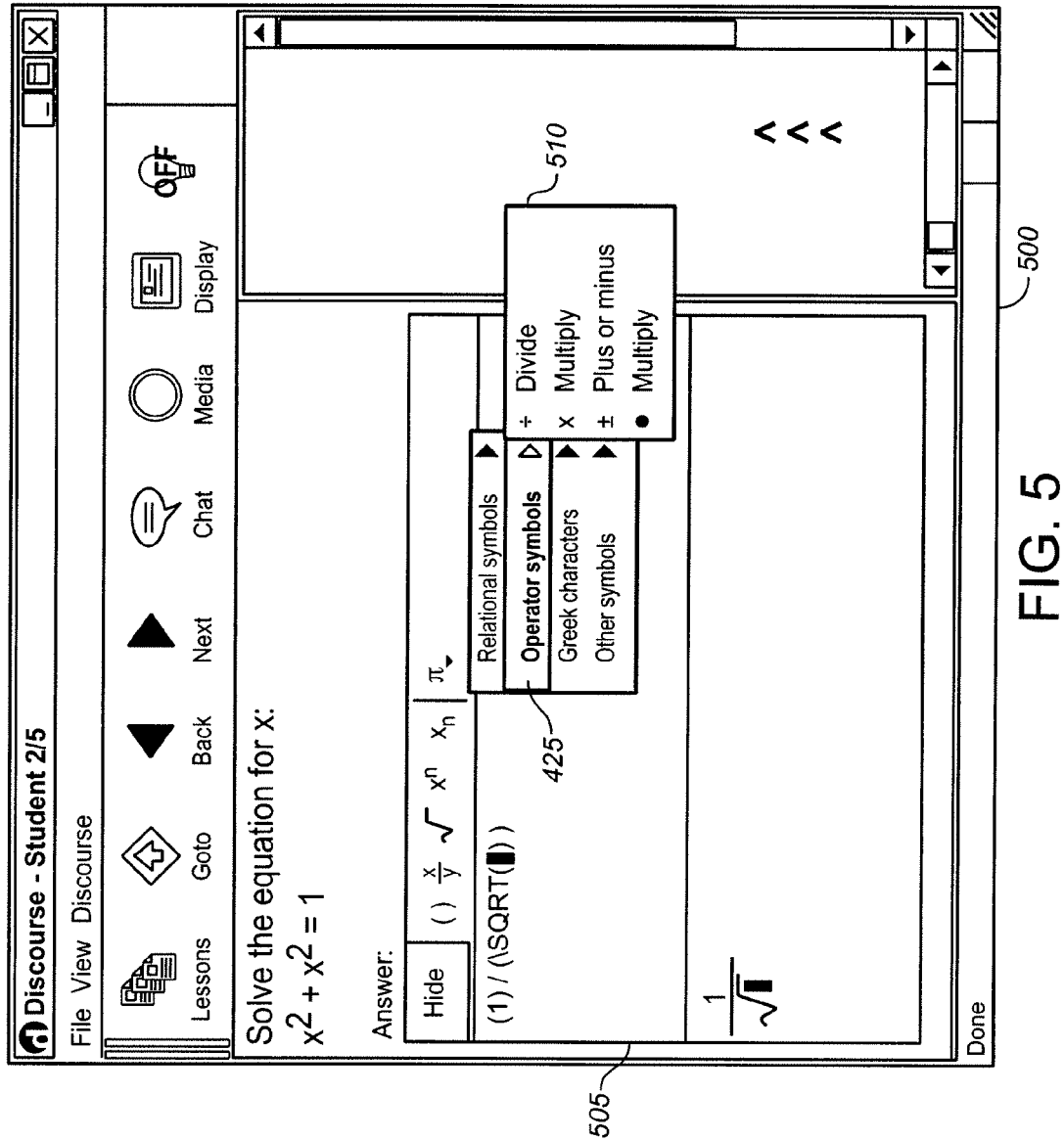
FIG. 5 depicts a screen capture of a second exemplary student browser view of a rendered equation and an equation editor according to an embodiment of the present invention.

As shown in FIGS. 4 and 5, students are preferably provided with a question 406 within a frame 404 in an application on the student computer. The question 406 may require the students to respond in the form of a response 415. A response 415 may be in the form of an equation or expression. Equations or expressions may be entered by, for example, selecting one or more symbols from a menu, selecting one or more symbols using buttons in the application, using one or more hotkeys, and/or entering information in the character-based syntax. In an embodiment, all symbols, variables, and operations may be presented to the user simultaneously as a palette of buttons. The student computer may transmit the response to the teacher computer or a separate comparison device where the response is automatically scored. The teacher may optionally subjectively evaluate a written explanation (not shown).

Figure 6:
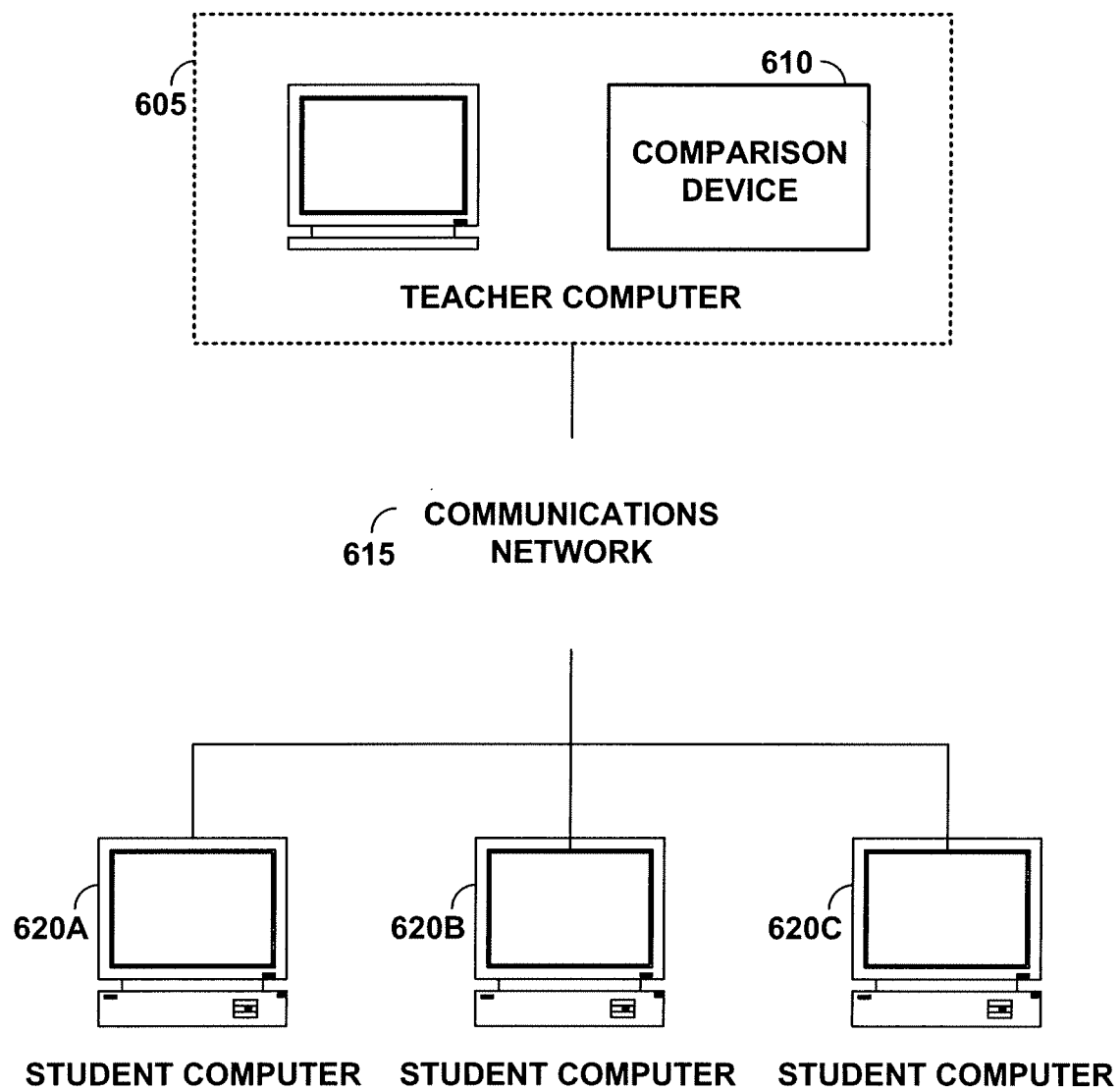
FIG. 6 depicts an exemplary embodiment of the present invention in which the comparison device is co-located with the teacher computer.

FIG. 6 depicts an exemplary embodiment of the present invention in which the comparison device is co-located with a teacher computer. In an embodiment, the teacher computer 605 may compare responses to a question description received from the student computers 620a-c to one or more answers corresponding to the question description using a comparison device 610 that is resident in the teacher computer 605. A response may be transmitted from a student computer, such as 620a, to the teacher computer 605 via a communications network 615. Once the teacher computer 605 receives a response, the comparison device 610 may compare the response with one or more answers and transmit a reinforcement signal to the student computer 620a via the communications network 615. The nature of the reinforcement signal may be based on whether the comparison device 610 favorably compares the received response to the one or more answers.

Figure 7:
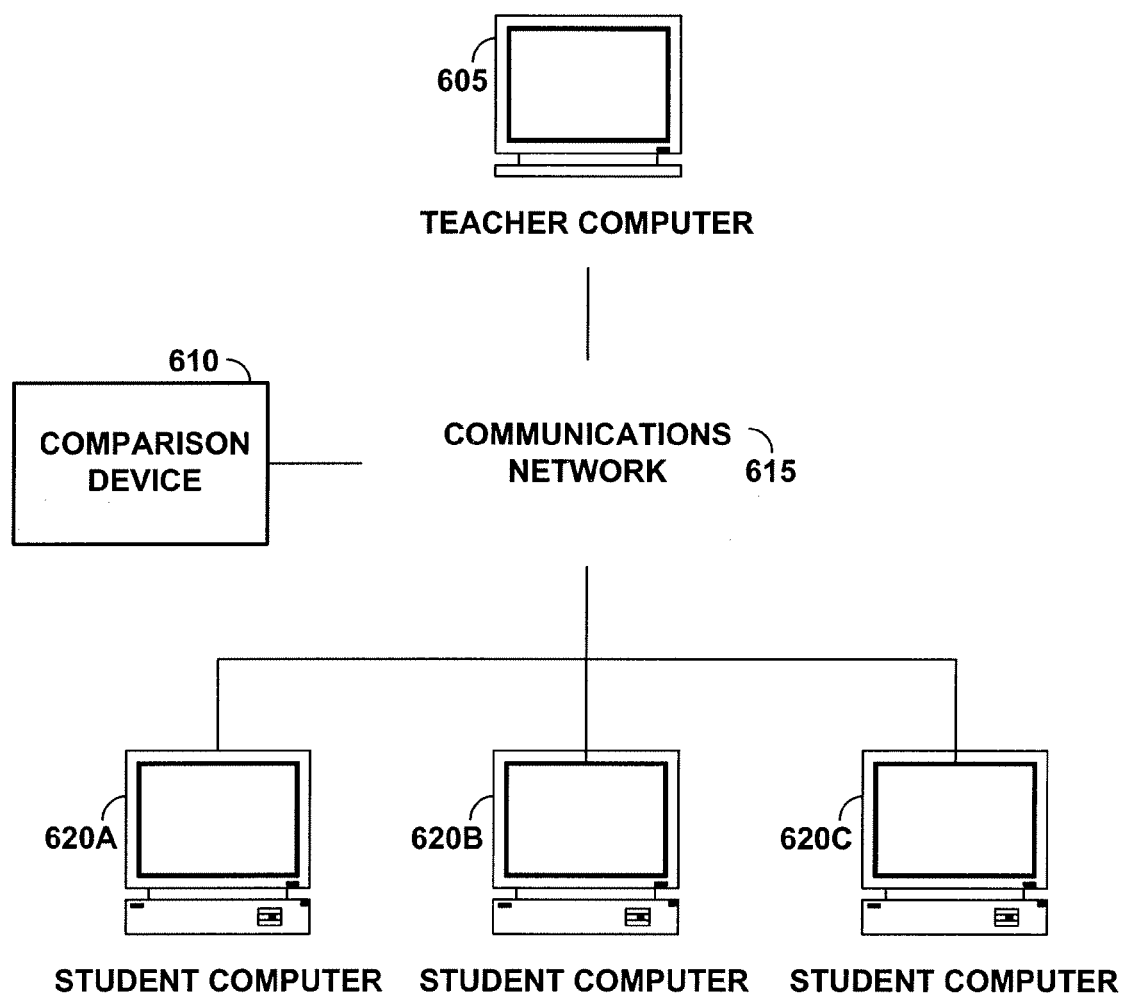
FIG. 7 depicts an exemplary embodiment of the present invention in which the comparison device is connected to the communications network.

FIG. 7 depicts an exemplary embodiment of the present invention in which the comparison device is connected to the communications network. In an alternate embodiment, the comparison device 610 may be connected to the teacher computer 605 via the communications network 615. One or more answers to a question description may be contained on a comparison device 610. In an embodiment, the teacher computer 605 may transmit the one or more answers to the comparison device 610. The teacher computer 605 may then transmit the question description to the student computers 620a-c via the communications network 615. A response generated by a student computer, such as 620a, may be transmitted to the comparison device 610 via the communications network 615. The comparison device 610 may transmit a reinforcement signal to the teacher computer 605 and/or the student computer from which the response was received 620a via the communications network 615. The nature of the reinforcement signal may be based upon whether the comparison device 610 favorably compares the response to the one or more answers.

In an embodiment, a comparison device 610 may be resident on each student computer 620a-c. In this embodiment, a teacher computer 605 may transmit a question description and one or more answers to each student computer 620a-c via the communications network 615. The student computers may display the question description. The one or more answers may be sent to the comparison device 610 and may not be displayed. As a user responds to the question description, the comparison device 610 may compare the response to the one or more answers and may generate a reinforcement signal. The nature of the reinforcement signal may be based upon whether the comparison device 610 favorably compares the response to the one or more answers.

In an embodiment, an interface may implement at least one of the following commands and functions. Examples showing the use of the commands and functions according to the preferred embodiment are presented for clarity where appropriate. Any standard computer interface, such as toolbars, menus, buttons, hot keys and the like may be used to implement the present invention. The scope of the present invention is not intended to be limited to the embodiment presented below, which is presented only to further describe one of many possible embodiments of the present invention.

Keyboard Entries

RETURN—Press the ENTER key to insert "RETURN" at the current insertion point in the text box. In response to pressing ENTER, the next notation may be displayed below the previously entered notation.

TAB—Press the TAB key to move to and select the next insertion marker or to move to the end of the text entry in the text box.

Insertion Markers

As shown in FIG. 1, toolbar buttons for parentheses 110, fraction 115, square root 120, superscript 125, and subscript 130 may be presented in an equation editor dialog window 100. The buttons 110-130 may insert characters and special insertion markers associated with the respective button. The cursor may blink in the text box 105 and a vertical gray bar (not shown) may be displayed when one of these buttons 110-130 is selected. An insertion marker acts as a placeholder for the content of the expression. For example, to enter "(x+y)," the parentheses button 110 may be selected. The insertion marker may appear between the open and close parentheses. The user may then type "x+y" at the insertion point.

Button/Menu Entries

PARENTHESES—Parentheses may be entered directly into the text box 105. Alternatively, a parentheses button 110 or a parentheses menu item or hot key sequence may be selected to insert parentheses enclosing an insertion marker. If text is selected prior to clicking the parentheses button 110, selecting the parentheses menu item or entering the parenthesis hot key sequence, the selected text may be surrounded by parentheses.

FRACTION—A forward slash ("/") may be entered directly into the text box 105 to represent a fraction (e.g., type "x/y"), or the fraction button 115 or a fraction menu item or hot key sequence may be selected to insert a forward slash and parentheses enclosing insertion markers for each of the numerator and the denominator. For example, to insert "(x+y)/(1+x)," a user may click the fraction button 115, select the fraction menu item or enter the fraction hot key sequence, type "x+y," press TAB, and type "1+x." If text is selected prior to clicking the fraction button 115, selecting the fraction menu item or entering the fraction hot key sequence, the selected text becomes the numerator of the fraction and is automatically enclosed in parentheses.

SQUARE ROOT—The square root button 120 or the square root menu item may be selected, or the square root hot key sequence may be entered, to insert "\SQRT" followed by parentheses enclosing an insertion marker. For example, to insert the notation for the square root of 4, a user may click the square root button 120, select the square root menu item or enter the square root hot key sequence and type "4." If text is selected prior to clicking the square root button 120, selecting the square root menu item or enter the square root hot key sequence, the selected text is surrounded by parentheses and becomes the content of the square root expression.

SUPERSCRIPT—The notation for a superscript includes two expressions: the subject expression to which the superscript is attached and the superscript expression, which is displayed in a smaller font higher than the subject expression. The superscript button 125, the superscript menu item or superscript hot key sequence may be selected to enter "\SUPER" followed by parentheses enclosing an insertion marker for the superscript expression. For example, to insert the notation for x-squared, a user may type "x," click the superscript button 125, select the superscript menu item or enter the superscript hot key sequence, and type "2." If text is selected prior to selecting the superscript button 125 or the superscript menu item, or entering the superscript hot key sequence, the selected text becomes the superscript and is automatically enclosed in parentheses.

SUBSCRIPT—The notation for subscript includes two expressions: the subject expression to which the subscript is attached and the subscript expression, which is displayed in a smaller font lower than the subject expression. The subscript button 130, the subscript menu item or the subscript hot key sequence may be selected to enter "\SUB" followed by parentheses enclosing an insertion marker for the subscript expression. For example, to insert the notation for x-squared, a user may type "x," click the subscript button 130, select the subscript menu item or enter the subscript hot key sequence, and type "2." If text is selected prior to selecting the subscript button 130, selecting the subscript menu item or entering the subscript hot key sequence, the selected text becomes the subscript and is automatically enclosed in parentheses.

MATH SYMBOL—Four categories of symbols may be provided: Relational symbols 420, Operator symbols 425, Greek characters 430, and Miscellaneous/Other symbols 435. To access the symbols, a user may click the math symbol button 135, select the math symbol menu item or enter the math symbol hot key sequence. A menu may be displayed in which each of the four categories is represented. Upon selection of a category, a sub-menu may then be displayed in which the symbols corresponding to the selected category are displayed. The user may select a desired symbol. The symbol may then be entered at the current insertion point in the text box. FIG. 4 depicts a sub-menu 440 listing exemplary Relational symbols 420 according to an embodiment of the present invention. FIG. 5 depicts a sub-menu 510 listing exemplary Operator symbols 425 according to an embodiment of the present invention.

Nesting Expressions

Expression may be nested to many levels of complexity. For example, to insert a fraction inside a square root symbol, a user may click the square root button 120, click the fraction button 115, type the numerator, press TAB and type the denominator. Alternatively, the user may click the fraction button 115, type the numerator, press TAB, type the denominator, select the fraction and click the square root button 120. Alternatively, a user may select a menu item or enter a hot key sequence instead of selecting a button.

Editing Math Notation

Each entry from a toolbar button 110-130 may be treated as a single unit when the text representation is edited.

To edit a question that uses math notation, a user may select the math notation and click the MATH NOTATION button (not shown). The Edit Math Notation dialog box 100, such as the one depicted in FIG. 1, may then be displayed. The user may edit the math notation using the Edit Math Notation dialog box 100. Upon completion, the user may click an OK button 140.

In order to edit a math notation answer, a user may double-click inside the answer. The Edit Math Notation dialog box 100 may then be displayed. The user may edit the math notation using the Edit Math Notation dialog box 100 and click the OK button 140 upon completion.

Alternate Edit Math Notation dialog boxes may be implemented for a teacher computer and a student computer. The Edit Math Notation dialog box 100 depicted in FIG. 1 may be used on a teacher computer and include a rendered expression display window 145 which may show how the entered text string will be displayed upon acceptance of the text string. The expression display window 145 may be used to verify the correctness of the text string entered in the teacher-accessible portion of the Edit Math Notation dialog box 100. As shown in FIG. 4, an exemplary Edit Math Notation dialog box 410 for a student computer may be incorporated into an Equation Editor application 402 implemented within a web browser 400. As shown in FIG. 5, an Edit Math Notation dialog box 505 for a student computer may alternately be incorporated into a separate Equation Editor application 500.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A system for editing, comparing, and resolving equations, comprising:

at least one teacher computer that implements a teacher equation editor application that generates a question description and generates at least one answer corresponding to the question description and including at least one of an equation and an expression;

at least one student computer that implements a student equation editor application that generates a response corresponding to the question description and including at least one of a response equation and a response expression;

at least one comparison device that compares the response with the answer and outputs a comparison result; and a communications network operably connecting the teacher computer, the student computer, and the comparison device, wherein changes to the response received at the student equation editor application are transmitted to the teacher computer and displayed using the teacher computer on a change-by-change basis, wherein the changes to the response are received in rendered format, wherein the student equation editor is configured to convert the rendered format to a character syntax in real time and to transmit the character syntax to the teacher computer in real time, and wherein the teacher computer is configured to translate the character syntax to a rendered format for display in real time.

2. The system of claim 1 wherein the teacher computer generates the question via manual operator input.

3. The system of claim 1 wherein the teacher computer generates the answer via manual operator input.

4. The system of claim 1 wherein the comparison device is the teacher computer.

5. The system of claim 1 wherein the comparison result is transmitted as a learning reinforcement signal to at least one of the teacher computer and the student computer.

6. The system of claim 1 wherein the student equation editor application comprises one or more program instructions for:
receiving the question description via the communications network;
displaying the question description on a student computer display; and
receiving one or more responses to the question description via a student computer input device.

7. The system of claim 6 wherein the student computer input device comprises a pointing device.

8. The system of claim 6 wherein the student computer input device comprises a keyboard.

9. The system of claim 6 wherein the student equation editor application further comprises one or more program instructions for:
receiving one or more answers corresponding to the question description via the communications network; and
comparing each response with the one or more answers corresponding to the question description.

10. The system of claim 9 wherein the student equation editor application further comprises one or more program instructions for:
generating at least one learning reinforcement signal; and
displaying the at least one learning reinforcement signal on the display corresponding to the student computer display.

11. The system of claim 10 wherein generating at least one reinforcement signal occurs at substantially the same time as at least one response to the question description is received.

12. The system of claim 6 wherein the student equation editor application further comprises one or more program instructions for:
receiving at least one learning reinforcement signal from the teacher computer via the communications network; and
displaying the at least one learning reinforcement signal on the student computer display.

13. The system of claim 1 wherein the student equation editor application comprises a web browser application.

14. The system of claim 1, wherein the changes are displayed using the teacher computer in real time.

15. The system of claim 1, wherein the changes are displayed using the teacher computer each time a character of the response is changed at the student equation editor application.

16. A method for editing, comparing, and resolving equations, comprising:

operably interconnecting a communications network, a teacher computer, a student computer, and a comparison device;
implementing with the teacher computer a teacher equation editor application that generates a question description and generates at least one answer corresponding to the question description and including at least one of an equation and an expression;
implementing with the student computer a student equation editor application that generates a response corresponding to the question description and including at least one of a response equation and a response expression;
transmitting changes to the response received by the student equation editor application to the teacher computer, wherein the changes are displayed using the teacher computer on a change-by-change basis, wherein the changes to the response are received in rendered format, wherein the student equation editor is configured to convert the rendered format to a character syntax in real time and to transmit the character syntax to the teacher computer in real time, and wherein the teacher computer is configured to translate the character syntax to a rendered format for display in real time; and
using the comparison device to compare the response with the answer and output a comparison result.

17. The method of claim 16 further comprising generating the question via manual operator input.

18. The method of claim 16 further comprising generating the answer via manual operator input.

19. The method of claim 16 further comprising transmitting the comparison result as a learning reinforcement signal to at least one of the teacher computer and the student computer.

20. The method of claim 16 wherein the student equation editor application comprises one or more program instructions for:
receiving a question description via the communications network;
displaying the question description on a student computer display; and
receiving one or more responses to the question description via a student computer input device.

21. The method of claim 20 wherein the student computer input device comprises a pointing device.

22. The method of claim 20 wherein the student computer input device comprises a keyboard.

23. The method of claim 20 wherein the student equation editor application further comprises one or more program instructions for receiving at least one learning reinforcement signal from the comparison device via the communications network.

24. The method of claim 16 wherein the student equation editor application comprises a web browser application.

25. The method of claim 16, wherein the changes are displayed using the teacher computer in real time.

26. A non-transitory computer program product for editing, comparing, and resolving equations, comprising a computer-readable storage medium containing program instructions tangibly embodied thereon as code means for:
operably interconnecting a communications network, a teacher computer, a student computer, and a comparison device;
implementing with the teacher computer a teacher equation editor application that generates a question description and generates at least one answer corresponding to the question description and including at least one of an equation and an expression;

implementing with the student computer a student equation editor application that generates a response corresponding to the question description and including at least one of a response equation and a response expression;

transmitting changes to the response received by the student equation editor application to the teacher computer, wherein the changes are displayed using the teacher computer on a change-by-change basis, wherein the changes to the response are received in rendered format, wherein the student equation editor is configured to convert the rendered format to a character syntax in real time and to transmit the character syntax to the teacher computer in real time, and wherein the teacher computer is configured to translate the character syntax to a rendered format for display in real time; and using the comparison device to compare the response with the answer and output a comparison result.

27. The computer program product of claim 26 further comprising code means for generating the question via manual operator input.

28. The computer program product of claim 26 further comprising code means for generating the answer via manual operator input.

29. The computer program product of claim 26 further comprising code means for transmitting the comparison result as a learning reinforcement signal to at least one of the teacher computer and the student computer.

30. The computer program product of claim 26, wherein the changes are displayed using the teacher computer in real time.

31. A method of editing, comparing, and resolving equations comprising:

receiving a question description on a student computer system from a teacher computer system;

displaying the question description;

receiving at least one response to the question description, wherein each response comprises one or more of an equation and an expression; and transmitting the at least one response to the teacher computer system, wherein received changes to the response are transmitted to the teacher computer system and displayed using the teacher computer system on a change-by-change basis, wherein the changes to the response are received in rendered format, wherein the rendered format is converted to a character syntax in real time and the character syntax is transmitted to the teacher computer in real time, and wherein the teacher computer system is configured to translate the character syntax to a rendered format for display in real time.

32. The method of claim 31, wherein the changes are displayed using the teacher computer in real time.

33. The method of claim 31, further comprising:

receiving at least one learning reinforcement signal from the teacher computer system.

* * * * *